United States Patent
Peyton-Jones et al.

(10) Patent No.: US 7,266,763 B2
(45) Date of Patent: Sep. 4, 2007

(54) USER DEFINED SPREADSHEET FUNCTIONS

(75) Inventors: Simon Peyton-Jones, Cambridge (GB); Alan Frank Blackwell, Cambridge (GB); Margaret Myers Burnett, Corvallis, OR (US)

(73) Assignee: Microsoft Corporation, Redmond, WA (US)

(*) Notice: Subject to any disclaimer, the term of this patent is extended or adjusted under 35 U.S.C. 154(b) by 353 days.

(21) Appl. No.: 10/306,937

(22) Filed: Nov. 26, 2002

(65) Prior Publication Data

US 2004/0103366 A1   May 27, 2004

(51) Int. Cl.
*G06F 17/00* (2006.01)
*G06F 7/00* (2006.01)

(52) U.S. Cl. .................. 715/503; 715/504; 715/538; 715/764; 707/1

(58) Field of Classification Search ............... 715/503, 715/538, 504, 764, 777; 707/1, 3
See application file for complete search history.

(56) References Cited

U.S. PATENT DOCUMENTS

| | | | | |
|---|---|---|---|---|
| 5,603,021 A * | 2/1997 | Spencer et al. | ................ | 707/4 |
| 5,890,174 A * | 3/1999 | Khanna et al. | ............ | 715/504 |
| 6,055,548 A * | 4/2000 | Comer et al. | ............ | 715/503 |
| 6,631,497 B1 * | 10/2003 | Jamshidi et al. | ............ | 715/514 |
| 6,779,151 B2 * | 8/2004 | Cahill et al. | ................ | 715/503 |
| 6,978,261 B2 * | 12/2005 | Cotner et al. | .................. | 707/2 |
| 6,988,241 B1 * | 1/2006 | Guttman et al. | ............ | 715/503 |
| 2002/0091730 A1 * | 7/2002 | Bedford et al. | ............ | 707/503 |
| 2002/0188629 A1 * | 12/2002 | Burfoot | ...................... | 707/503 |
| 2004/0133567 A1 * | 7/2004 | Witkowski et al. | ............ | 707/3 |
| 2005/0015714 A1 * | 1/2005 | Cahill et al. | ................ | 715/503 |
| 2005/0081141 A1 * | 4/2005 | Jonsson | ...................... | 715/503 |
| 2006/0036939 A1 * | 2/2006 | Hobbs et al. | ............... | 715/503 |
| 2006/0224946 A1 * | 10/2006 | Barrett et al. | ............... | 715/503 |
| 2007/0055945 A1 * | 3/2007 | Weber et al. | ............... | 715/777 |

OTHER PUBLICATIONS

Microsoft Excel 2000, Screenshots, Dec. 31, 1999, pp. 1-3 and 8-11.*
Microsoft Visual Basic 6.0, Screenshots, Dec. 31, 1999, pp. 4-7 (Same as Excel 2000 Screenshots).*
Jones et al, "A User-Centred Approach to Functions in Excel", Jun. 30, 2003, pp. 1-12, http://research.microsoft.com/~simonpj/Papers/excel/excel.pdf.*
Chris Clack and Lee Braine, "Object-Oriented Functional Spreadsheets", Sep. 1997, Proc. 10th Glasgow Workshop on Functional Programming (GlaFP'97), pp. V11/1-116.*
Ambler, Allen L; "Forms: Expanding the Visualness of Sheet Language" from Workshop on Visual Languages Aug. 19-21, 1987, Lenkoping Sweden; pp. 105-117.
Ambler, Allen L. and Burnet, Margaret M.; "Visual Forms of Iteration that Preserve Single Assignment" Journal of Visual Languages and Computing 1990 (1) pp. 159-181.
Ambler, Allen; "The Formulate Visual Programming Language : Representing Structured Data" Dr. Dobb's Journal, Aug. 1999 pp. 21-28.
Burnett, M.; Atwood, J.; Walpole-Djang, R.; Gottfried, H., Reichwein, J.; and Yang, S.; "Forms/3: A First-Order Visual Language to Explore the Boundaries of the Spreadsheet Paradigm"; Journal of Functional Programming; 2001; 51 pages.

* cited by examiner

Primary Examiner—Stephen Hong
Assistant Examiner—Adam L. Basehoar

(57) ABSTRACT

A method of creating a user-defined function in a spreadsheet application is provided. The user-defined function is callable by a calling label in the spreadsheet application. A formula is received in the spreadsheet application. The formula is transferred to a function sheet of the spreadsheet application to define at least a portion of a function body. An interface is defined by identifying the calling label, an input parameter and a result parameter of the user-defined function. The function body operates on an argument corresponding to the input parameter and generates a result corresponding to the result parameter. The interface is stored in association with the function body to create the user-defined function.

15 Claims, 9 Drawing Sheets

USER DEFINED SPREADSHEET FUNCTIONS

TECHNICAL FIELD

The invention relates generally to spreadsheet applications, and more particularly to user defined spreadsheet functions.

BACKGROUND OF THE INVENTION

Much of the utility of a spreadsheet application lies in the ability of a user to capture data and algorithmic operations in an organized structure, such as a worksheet, without the need for professional programming capabilities. A non-programmer user can specify complex data relationships, including summing operations, amortization operations, and so on, without learning a programming language. The user, for example, may enter a formula into a cell of the worksheet (e.g., "=A1+B1"), and the result of the formula is returned and displayed in the cell.

One of the problems with existing user-defined spreadsheet formula techniques, however, is that formulae are not encapsulated or labeled to support reuse or parameter passing. As such, when a task becomes more complex, professional programming languages are employed, instead of the less complicated spreadsheet-oriented formula interface. Furthermore, when a correction or customization is required to a set of formulae (e.g., formulae instantiated in multiple cells or multiple spreadsheets), the changes must be made to each formula instance, amplifying the chance of error during the edits. Reusable application-provided functions (e.g., SUM( )) and third-party pluggable functions exist in spreadsheets, but these functions are built-in (or plugged in), programmed in an advanced programming language, and not customizable by a user.

SUMMARY OF THE INVENTION

Embodiments of the present invention solve the discussed problems by allowing users to create new named functions that are defined using the spreadsheet formula paradigm. Such functions provide customization, reusability, exportation, and parameter passing using formula-type operations through a user-definable function interface in a spreadsheet application. Most users are familiar with the use of formulae in a spreadsheet application but are not willing or capable to perform the more advanced programming required to develop their own third-party plug in functions. Therefore, extending the formula feature of existing spreadsheet application to offer more powerful user-defined functions provides great benefit to users requiring more flexibility.

In implementations of the present invention, articles of manufacture are provided as computer program products. One embodiment of a computer program product provides a computer program storage medium readable by a computer system and encoding a computer program that creates a user-defined function in a spreadsheet application. Another embodiment of a computer program product may be provided in a computer data signal embodied in a carrier wave by a computing system and encoding the computer program that creates a user-defined function in a spreadsheet application.

The computer program product encodes a computer program for executing on a computer system a computer process for creating a user-defined function in a spreadsheet application is provided. The user-defined function is callable by a calling label in the spreadsheet application. A formula is received in the spreadsheet application. The formula is transferred to a function sheet of the spreadsheet application to define at least a portion of a function body. An interface is defined by identifying the calling label, an input parameter and a result parameter of the user-defined function. The function body operates on an argument corresponding to the input parameter and generates a result corresponding to the result parameter. The interface is stored in association with the function body to create the user-defined function.

In another implementation of the present invention, a method of creating a user-defined function in a spreadsheet application is provided. The user-defined function is callable by a calling label in the spreadsheet application. A formula is received in the spreadsheet application. The formula is transferred to a function sheet of the spreadsheet application to define at least a portion of a function body. An interface is defined by identifying the calling label, an input parameter and a result parameter of the user-defined function. The function body operates on an argument corresponding to the input parameter and generates a result corresponding to the result parameter. The interface is stored in association with the function body to create the user-defined function.

In yet another embodiment of the present invention, a system for creating a user-defined function in a spreadsheet application is provided. The user-defined function is callable by a calling label in the spreadsheet application. A function sheet generator receives a formula in the spreadsheet application and transfers the formula to a function sheet of the spreadsheet application to define at least a portion of a function body. An interface definition module defines an interface identifying the calling label, an input parameter and a result parameter of the user-defined function. The function body operates on an argument corresponding to the input parameter and generates a result corresponding to the result parameter. An encapsulation module stores the interface in association with the function body to create the user-defined function.

These and various other features as well as other advantages, which characterize the present invention, will be apparent from a reading of the following detailed description and a review of the associated drawings.

DETAILED DESCRIPTION OF THE INVENTION

User-defined function capabilities in a spreadsheet application allow users to create new named functions that are defined using the spreadsheet formula paradigm. A user may define spreadsheet functions from formulae entered in a worksheet or function sheet of a spreadsheet application. The formula interface is well known to spreadsheet users; therefore, expanding the formula feature to provide encapsulated functions that can be imported, exported, customized, and compiled supplies new power and flexibility to users who do not wish to learn a programming language. Furthermore, the user-defined functions in spreadsheets incorporated some embodiments of the present invention represent vectors and matrices as "first class" values, similar to Boolean values, numbers, and strings.

Figure 1:
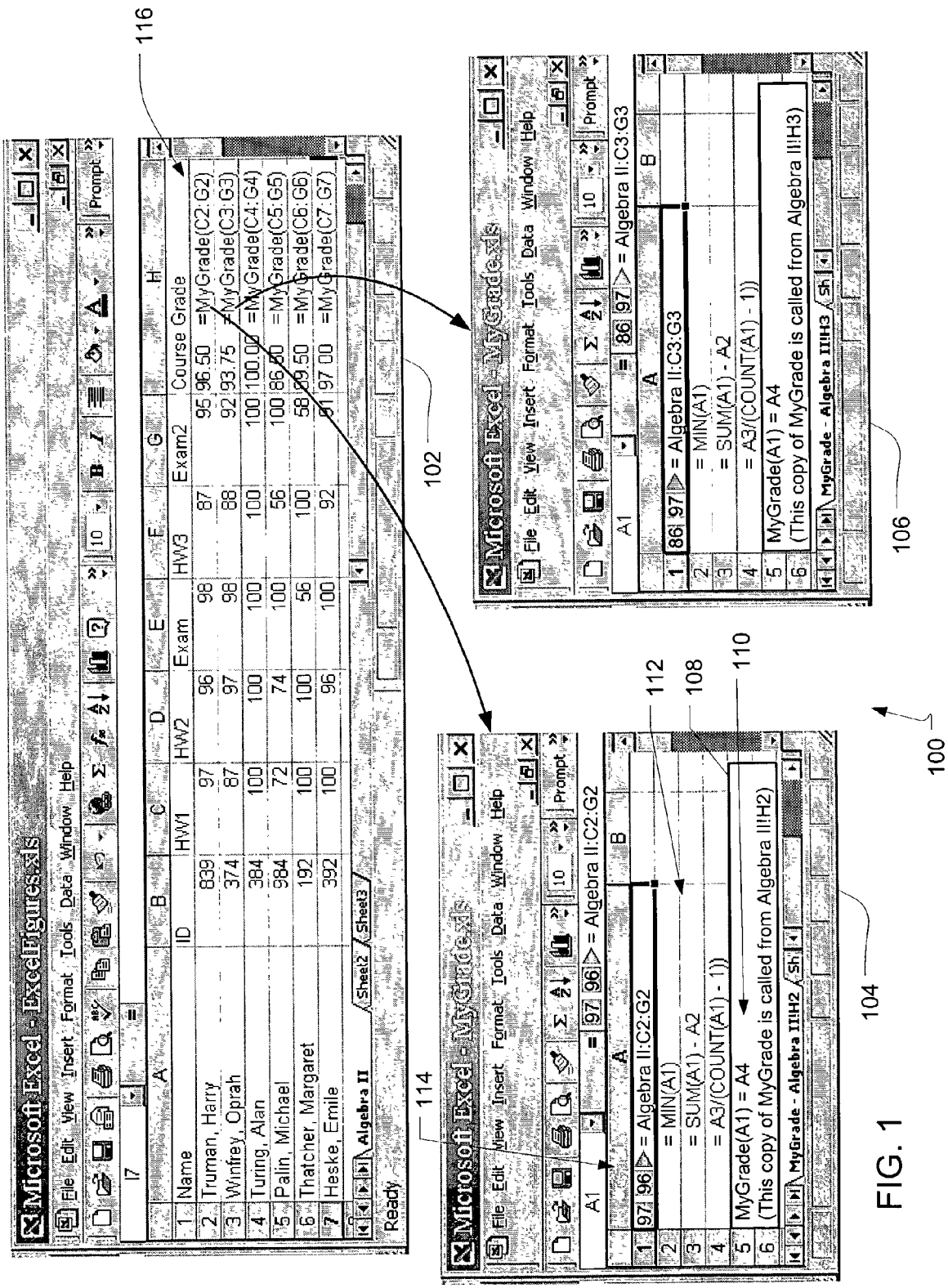
FIG. 1 depicts exemplary spreadsheet windows illustrating a user interface for an embodiment of the present invention.

FIG. 1 depicts spreadsheet windows illustrating a user interface for an embodiment of the present invention. The group of spreadsheet windows 100 includes an exemplary worksheet 102 (labeled "Algebra II") and two exemplary function sheets 104 and 106. In the worksheet 102, columns C-G display scores of students listed from row 2 to row 7. In this particular course, the final course grade is based on the average of four grades, each worth a hundred points each. The lowest score of the five scores for each student is dropped when calculating the course grade.

Figure 3:
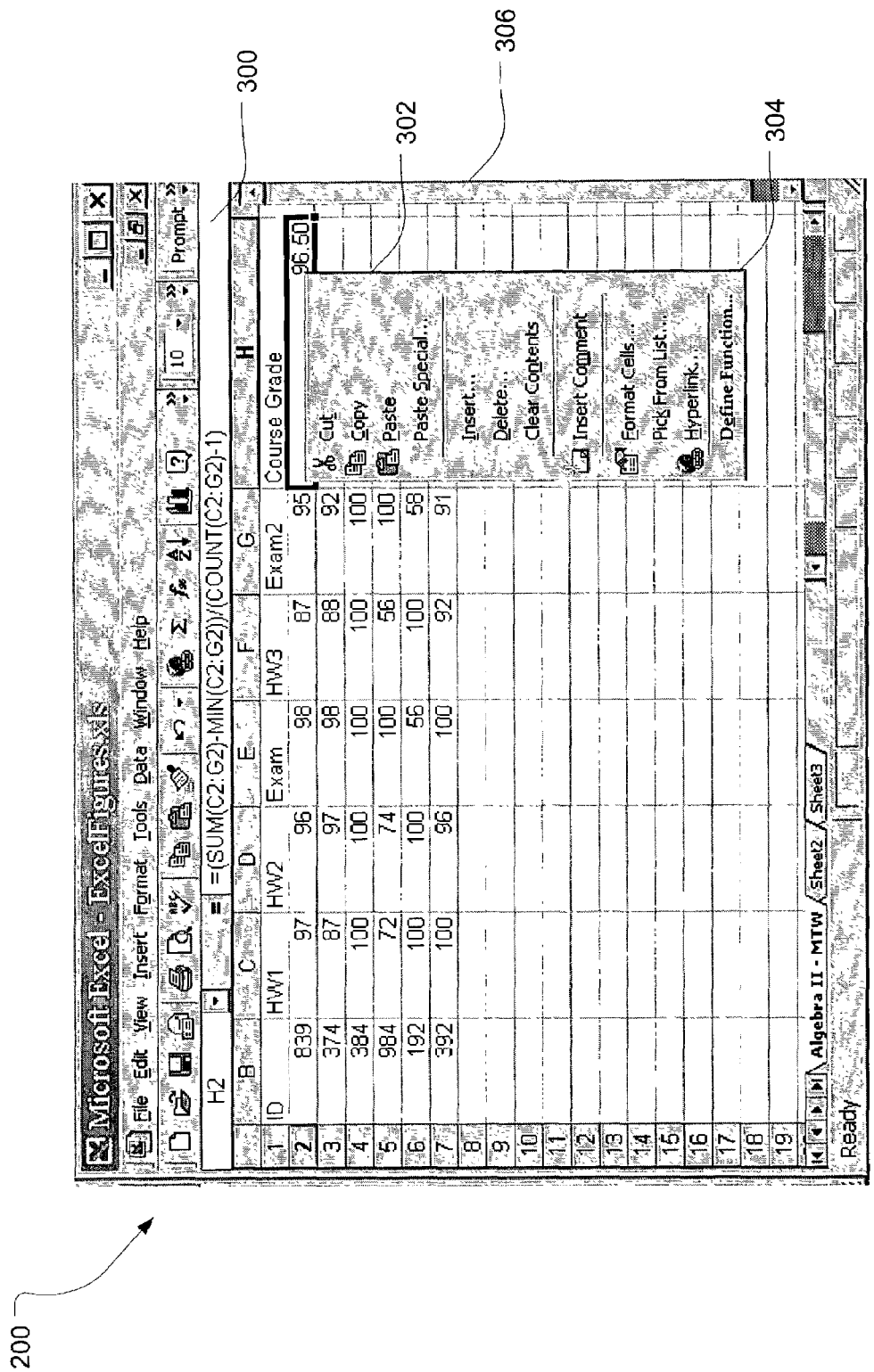
FIG. 3 depicts a spreadsheet window having a menu interface for defining a function in an embodiment of the present invention.

The problem of computing the course grade for each student is quite appropriate for user-defined formulae in a spreadsheet, like the EXCEL spreadsheet application. For example, the formula displayed in the formula bar 300 of FIG. 3 shows an exemplary formula for just such a computation. Such formulae can be duplicated in other cells using known cut-n-paste or cell-corner drag techniques. However, a user-defined formula does not have the first class characteristics of a built-in function, like MIN( ), SUM( ), etc. For example, such formulae are not labeled, are not callable from other formulae, and cannot be imported/exported from/to other spreadsheets. Furthermore, while third-party functions, which must be programmed using such languages as VISUAL BASIC language and C language, may be plugged into a spreadsheet application, such functions require non-trivial programming skills and are not customizable by a user.

The function sheet 104 displays an instance of the user-defined function entered into cell H2, as indicated by the interface panel 108. Generally, a function sheet defines formal input parameters, operations in the body of the function, and a result. Each function sheet displays an instance of a user-defined function in a worksheet-type window. The cell A1 of the function sheet 104 is specified as the argument of the function MyGrade( ), and the cell A4 of the function sheet 104 is specified as the result of the function MyGrade( ), as both are defined by the function interface 110 in the interface panel 108. In one embodiment, an exemplary interface panel includes:

the name of the function (e.g., MyGrade)
the formal input parameters accepted by the function (e.g., A1)
the result of the function (e.g., A4)—note: can be single cell or range of cells
the cell that called the function instance (e.g., H2)
a description of what the function does (e.g., "drops the lowest grade and returns a final course grade")
a function interface edit button to access and edit more detailed information through the interface panel (e.g., function name, formal parameters cells, parameter names, parameter comments, default parameter values, definition of result, help documentation, function categories, author names, and version/revision information)

It should be understood, however, that the general purpose of the interface panel 108 is to define the user-defined function's interface. Therefore, an interface panel in an alternative embodiment may include a different combination of information.

Cells A2-A4 comprise the "body" 112 of the function instance and specify the operations of the user-defined function, although any combination of cells and operators may be employed in the body of a function instance. Additional columns and rows may be used in any organization so long as the input argument cell(s) and the result cell are populated with the appropriate data. Furthermore, built-in and pluggable functions as well as other user-defined functions are callable from within the function body.

As described above and in the interface panel 108 of function sheet 104, the user-defined function defined within the function sheet 104 is an instance of the user-defined function "MyGrade" called from cell H2 of the worksheet "Algebra II". In one embodiment, the function sheet 104 for this specific instance therefore displays the arguments corresponding to the formal input parameters for this instance. For example, for the function instance "MyGrade—Algebra II!H2", the arguments are taken from cells C2:G2 of the Algebra II worksheet. The data values from these cells are displayed in a scrollable region 114 of cell A1 in the function sheet.

As shown at 116, the call in H2 to the MyGrade function instance displayed in function sheet 104 defines the arguments C2:G2 and displays the return value beside the function call. Note that, based on the function interface 110 in the interface panel 108, the return value is the result returned in cell A4 of the function sheet 104.

Likewise, the function sheet 106 displays the function instance of MyGrade called from Algebra II!H3. Note that the function sheet 106 reflects the change in arguments (i.e., to C3:G3) based on the specific call from the cell H3. It should be understood that the arguments to each function call may be independently set, regardless of the position of the calling cell.

From a user's perspective, calls to user-defined functions behave like calls to built-in functions. Such calls can be replicated using copy-and-paste operations or by dragging the corner of a cell containing the function through adjacent cells. In addition, arguments to a user-defined function may also vary in accordance with the new cell position or be designated as static (e.g., using the '$' designation in the EXCEL spreadsheet program).

Figure 2:
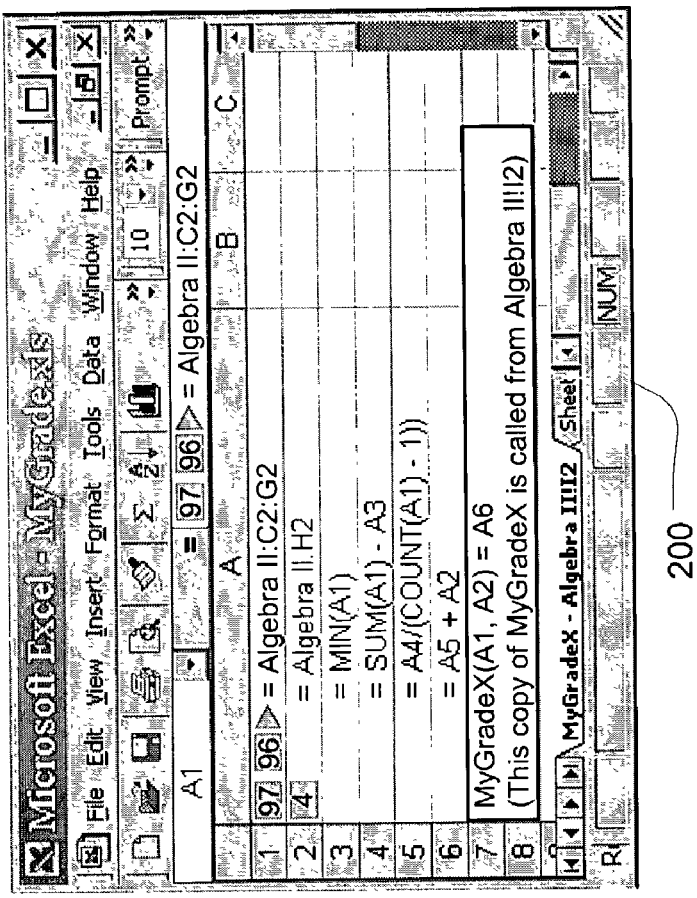
FIG. 2 depicts an exemplary function sheet for a function having multiple formal parameters in an embodiment of the present invention.

In addition, a function may include multiple formal parameters. For example, a function interface may indicate "MyGradeX(A1, A2)=A6", where A2 represents the amount of extra credit to be added to a student's grade. Assuming a column for "Extra Credit" is inserted at H2 of worksheet Algebra II, a call may be made to MyGradeX(C2:G2, H2) in cell I2 of the worksheet, where H2 provides the Extra Credit for Harry Truman. In this case, the function instance for MyGradeX, as called from cell I2, is shown in the function sheet 200 in FIG. 2.

FIG. 3 depicts a worksheet 306 having a menu interface for defining a function in an embodiment of the present invention. A formula bar 300 includes a formula that is capable of computing the same result as the user-defined function MyGrade( ). A user may select the cell H2 and generate a user-defined function sheet based on the formula in the selected cell. In one embodiment, a user may right-click on the selected cell using the mouse to display a context menu supporting creation of a user-defined function from the cell containing the formula. Another embodiment includes a menu item in the menu bar of the window to accomplish the same operation. Other techniques are also contemplated within the scope of the present invention.

The illustrated embodiment is invoked using the context menu technique. In response to a right-click on cell H2 of the worksheet Algebra II, a context menu 302 is displayed with a menu item 304 called "Define Function . . . ". By selecting menu item 304, a user begins a process for defining a user-defined function based on the formula in the selected cell (i.e., shown in the formula bar 300).

Figure 4:
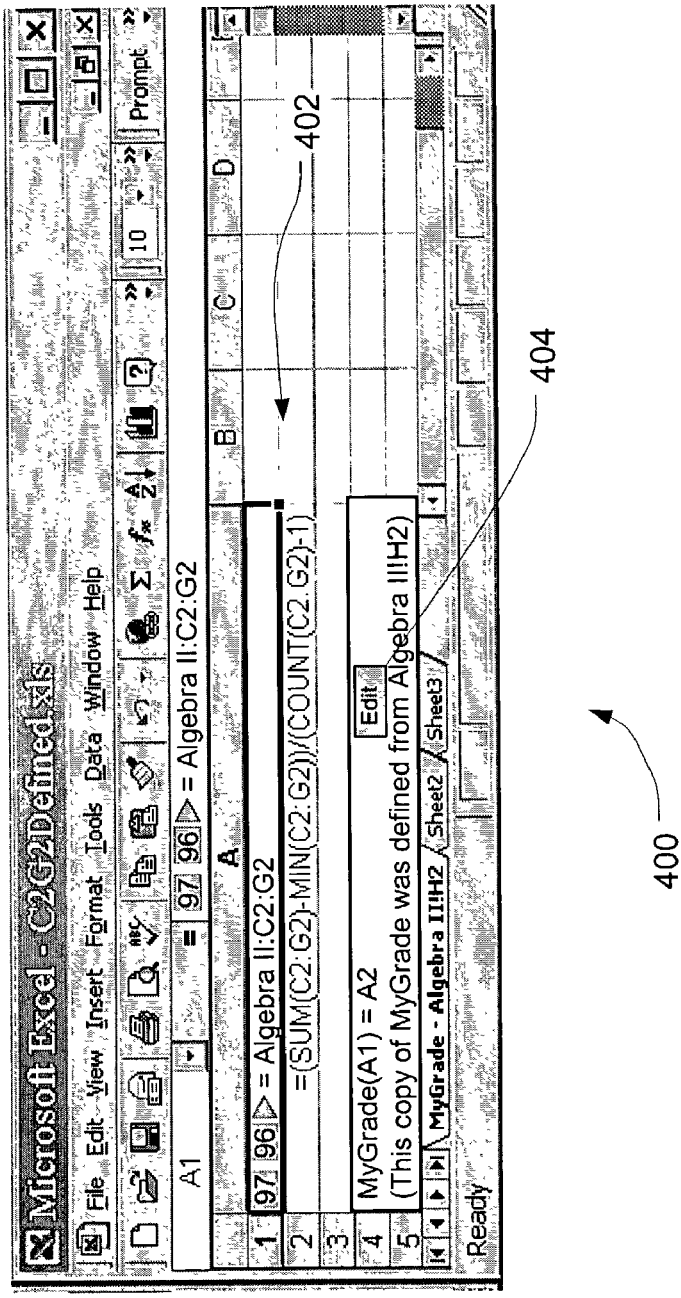
FIG. 4 depicts a function sheet in an embodiment of the present invention.

FIG. 4 depicts a function sheet 400 in an embodiment of the present invention. The function sheet 400 represents an exemplary result of a "Define Function . . . " operation performed on cell H2 of the worksheet 306 in FIG. 3. In one embodiment, the "Define Function . . . " operation requests user input to specify at least one of: (1) the function's name and (2) the formal parameters, and possibly other interface panel elements. In another embodiment, a default name is chosen along with default formal parameters based on a rule set. In both embodiments, the user may also customize the user-defined function within the function sheet 400, although this customization feature is not necessary in all embodiments of the invention. FIG. 4 also includes a function interface edit button 404, which invokes a function interface edit facility (such as shown in FIG. 5.

Figure 5:
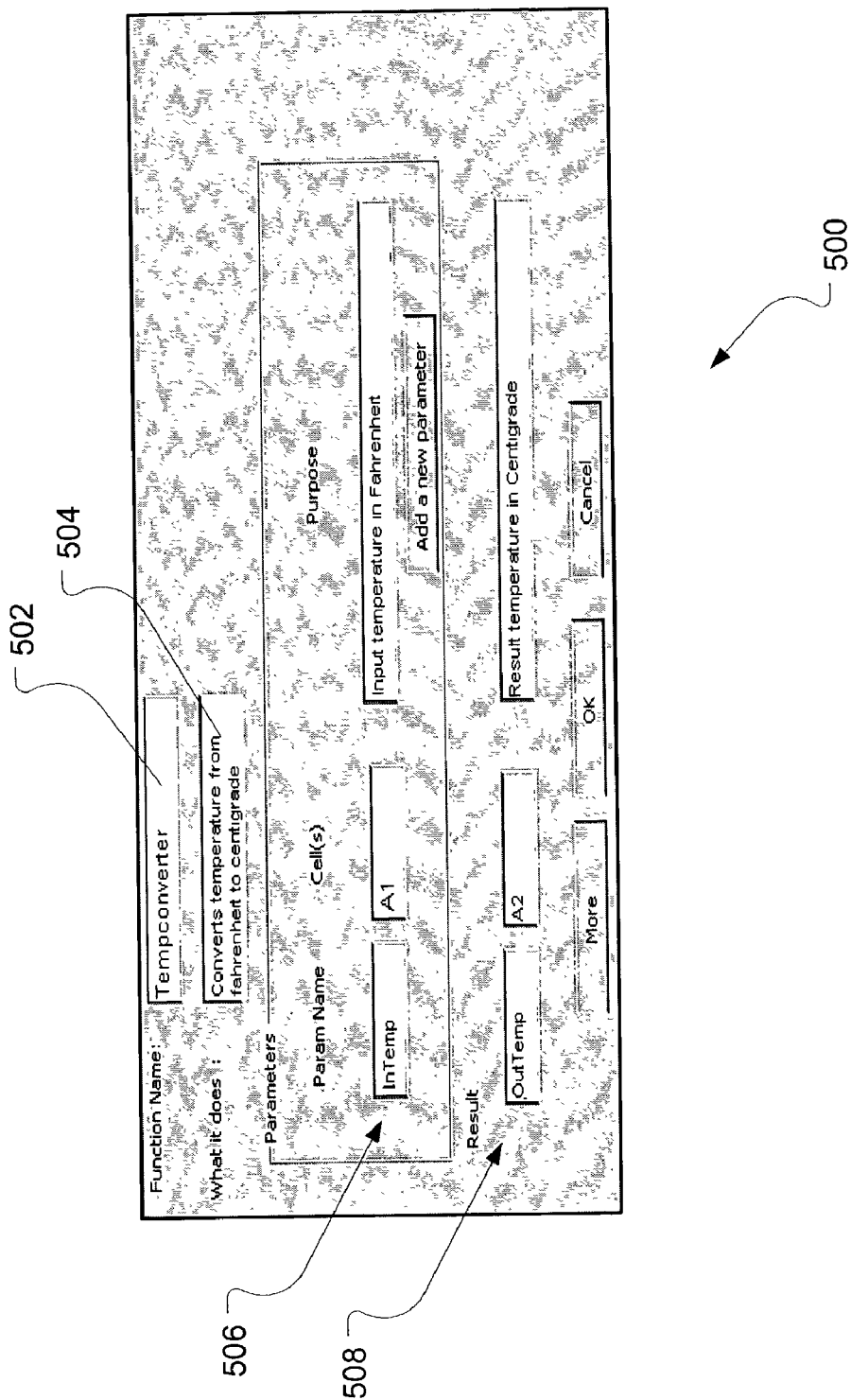
FIG. 5 depicts a function interface edit dialog box in an embodiment of the present invention.

FIG. 5 depicts a function interface edit dialog box in an embodiment of the present invention. By selecting a function interface edit button (such as shown in FIG. 4), the user may customize the function interface using the function interface edit dialog box 500. As shown in the illustrated embodiment, a user may provide a function name in a text box 502. For example, in one embodiment, the initial definition of the function may include a generic or arbitrary name. In another embodiment, the user may be initially prompted for a function name, such as by a user-defined function wizard. In the text box 502, however, the user may edit the function name after the initial definition sequence. A text box 504 allows the user to input a description of the function.

In input boxes 506, a user may edit one or more formal input parameters by specifying a parameter name, the cell in the function sheet that contains the argument value, and a comment associated with the formal input parameter. If the function has multiple input parameters, multiple rows of input boxes are provided. In input boxes 508, a user may edit a result parameter by specify a result name, a cell in the function sheet containing the result value, and a comment associated with the result.

Although the operations for the function are well defined by the formula, the formal parameters and the result are less certain. For example, if the formula is "=(A1+6/B3)", it is uncertain whether the user intends to create the function F(A1, 6, B3) or F(A1, B3). In one embodiment, predetermined rules are applied to provide an initial attempt at defining the function interface, and the user has an option of modifying the initial function interface to customize the inputs and outputs of the function. Likewise, a user may also customize the operations of the proposed function (e.g., by breaking the one line function 402 into the three line function shown in function sheet 104 in FIG. 1).

In another embodiment, the "Define Function . . . " operation invokes a user-defined function wizard, which walks a user through the process of creating the function based on cell H2 of the worksheet 306 in FIG. 3. The user is queried by the function wizard to provide the information that is not clearly available from the formula on which it is based. Exemplary information may include without limitation the function name, formal parameters, comments, etc. In addition, the function wizard may provide an operations editing window with syntax checking, spell checking, and other services to assist the user in completing or customizing the function.

In yet another embodiment, one or more formulae may be entered into a worksheet, which may then be converted or copied into a function sheet in response to a user command that is similar to "Define Function . . . " described above. For example, a user enters three formulae into a worksheet and selects them using the mouse. The user then invokes a "Define Function . . . " operation that generates a function sheet that is not associated with a specific calling cell but that includes the operations corresponding to the selected formulae. The user may then customize the function sheet to provide an interface or to modify the operations of the function.

In one embodiment, a "function" is considered generic and may be shared by multiple "instances" of the function, much in the way a single class may be shared by multiple instances of the class (i.e., objects) in an object oriented environment. In an alternative embodiment, functions may not be shared by multiple instances of the function. Instead, each instance of a function has its own distinct operations, interfaces, and storage.

In the embodiment with generic functions shared by multiple instances, when a user modifies a function sheet of an instance of a function, therefore, the user is queried about whether the modifications are meant only for the function instance or for the shared function (which may impact multiple function instances). In this manner, the ambiguity between a "function" and multiple "instances" of the same function can be resolved. If only a single function instance is modified, then a new function is created based on the modification, and the corresponding function instance is associated with the new function. The old function and the remaining instances of the old function remain unchanged.

The availability of user-defined functions in a spreadsheet highlights the benefit of more sophisticated representations of vectors and matrices in a spreadsheet. (A vector represents a one-dimensional matrix.) Previous approaches have manipulated vectors and matrices as groups of cells, but not as individual values. As such, previously representations of vectors and matrices in spreadsheets have had limitations that do not exist for other "first-class" values, such as strings, numbers, Booleans, and error values.

One such limitation is the inability of a vector or matrix to be referenced (as a vector or matrix value) in a single cell. In fact, in current approaches, if a vector or matrix is referenced in a formula as a value, only a first element of the vector or matrix is used in the formula. That is, the vector or matrix is converted to a scalar for purposes of use in the formula. From this limitation, it is clear that prior approaches do not allow a vector or matrix to be passed into a single cell of a function sheet and referenced as a cell containing a vector or matrix value within the function. (Built-in functions, which support vectors and matrices as arguments, are based on programming code, and therefore are not limited by the cell-based characteristics of user-defined functions.)

Therefore, in order to best support vectors and matrices in user-defined functions, an embodiment of the present invention can represent a vector or matrix in a worksheet cell or function sheet cell. This improvement allows vectors and matrices to be returned as a result value of a user-defined function, to be passed into a user-defined function as an argument value, and to be operated on by various matrix operations, such as matrix-to-matrix operations (e.g., arithmetic, comparisons, transposition, and filtering), matrix construction and rearrangement (e.g., literal matrix values, matrix joining, sorting, reversing, extracting rows or columns), matrix decomposition (e.g., indexing, slicing or selecting an i'th row of a matrix), element-by-element operations (e.g., taking a square root of each element of a matrix), and matrix reductions (e.g., adding or multiplying all elements in a matrix, counting the number of elements in a matrix).

Figure 6:
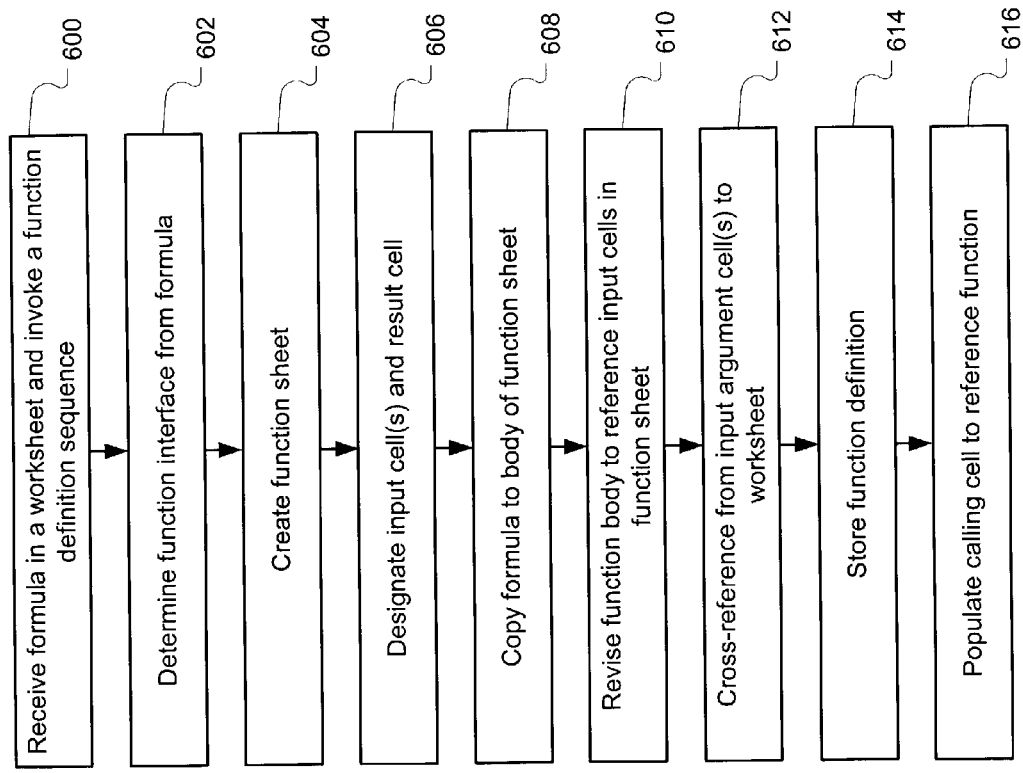
FIG. 6 illustrates operations for creating a user-defined function from a formula in a worksheet cell in an embodiment of the present invention.

FIG. 6 illustrates operations for creating a user-defined function from a formula in a worksheet cell in an embodiment of the present invention. A formula operation 600 receives a formula into a worksheet and invokes the function definition sequence. In one embodiment, a user types the formula into a cell of a worksheet, and the spreadsheet application receives the formula into its memory. An interface operation 602 determines the function interface for the formula. As discussed elsewhere in this specification, the interface operation 602 predicts the desired function interface; however, the prediction may not be exactly what the user intends. Therefore, the user may alter the predicted interface to obtain the desired input parameters and result.

A creation operation 604 creates a function sheet. In one embodiment, the function sheet may be displayed in the spreadsheet application with worksheet-type formatting in a window of its own or in a shared window. In an alternative embodiment, the function sheet is represented by a wizard or some other user interface display to allow access and/or manipulation by the user.

A designation operation 606 designates cells in the function sheet as containing one or more arguments and a result. For example, the designation operation 606 would designate cell A1 of the MyGrade function sheet 104 of FIG. 1 to contain an input parameter and cell A4 to contain a result. These designations are also recorded in the function interface panel and/or data structure. Note: It is possible for a function to have zero input parameters, but this is a less common case. A copy operation 608 copies the formula into the body of the function sheet. It should be understood that multiple formulas may be copied into the function body if multiple formula cells in the worksheet are selected for the function definition operation.

A revision operation 610 revises the operations in the function body to reference the input argument cells and to yield the result in the result cell (as designated in the designation operation 606). For example, if a formula in the worksheet (e.g., "=SUM(C2:G2)") originally referenced cells C2:G2 in the worksheet Algebra II, the revision operation 610 may replace the range identifier "C2:G2 " in formulas or operations of the function body with the cell identifier "A1", which has been designated as the input argument cell for the function. In addition, the cross-reference operation 612 inserts a cross-reference to cells C2:G2 of the Algebra II worksheet into the input argument cell A1 of the function sheet. In this manner, when the spreadsheet performs a recalculation operation, the values of Algebra II:C2:G2 are loaded into cell A1 of the function sheet and the operation SUM(A1) is executed on the argument.

A storing function 614 stores the function sheet in memory as a user-defined function. In one embodiment, the user-defined function is stored as a template that may be temporarily instantiated for each specific calling cell, input parameter(s), and result during a recalculation operation of the spreadsheet. This approach reduces storage overhead associated with each calling cell. In an alternative embodiment, an instance of the user-defined function is created and stored for each calling cell. This approach reduces the CPU usage involved with re-instantiating the function for each calling cell (e.g., when there are a great number of cells calling the same function), although the approach increases storage overhead. Having defined the function, a populating operation 616 populates the calling cell in the worksheet (e.g., Algebra II!H2) to call the referenced cell by loading a call to the named function, along with any arguments, into the calling cell. When executed, the result of the user-defined function is returned to the calling cell.

As discussed, a function label or name is associated with the user-defined function (e.g., MyGrade). This label may be input by the user during the interface operation 602 (such as through a function wizard) or automatically chosen by the interface operation 602 for editing by the user at a later stage of the process. Therefore, the interface operation 602 defines the interface of the function as MyGrade(A1)=A2.

Figure 7:
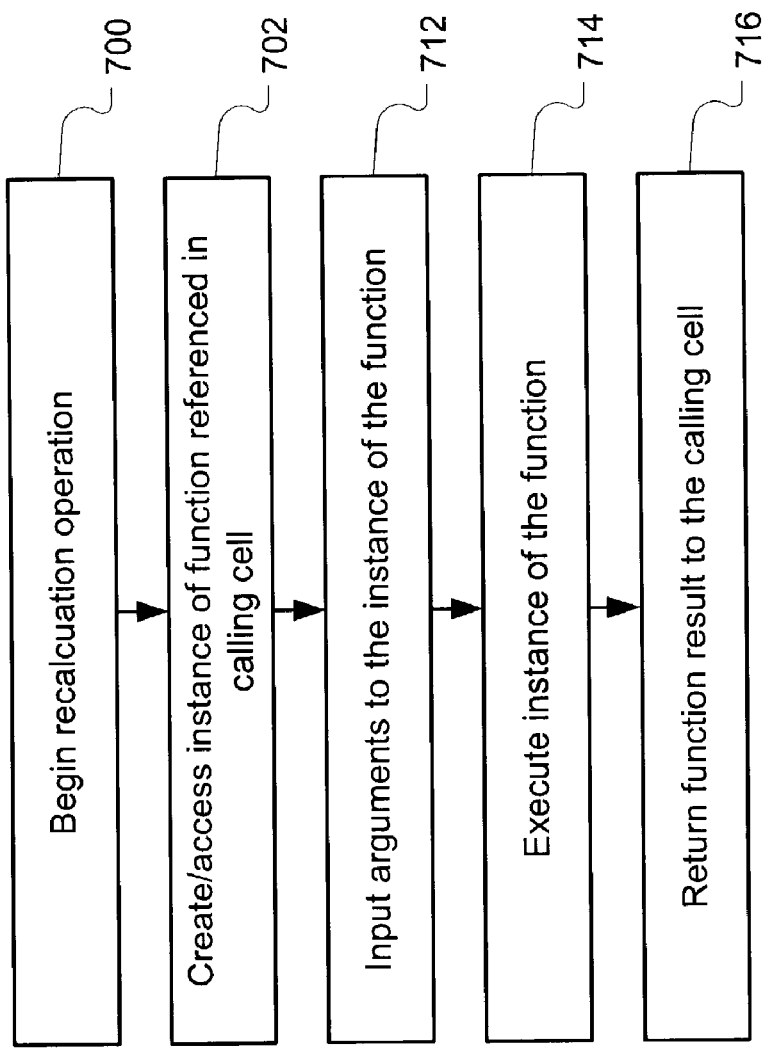
FIG. 7 illustrates operations for executing a user-defined function in an embodiment of the present invention.

FIG. 7 illustrates operations for executing a user-defined function in an embodiment of the present invention. A recalculation operation 700 begins within the spreadsheet application. A recalculation may be triggered for various reasons, including without limitation a change in a value in the spreadsheet or a user-request for a recalculation. An instantiation operation 702 creates or accesses an instance of a user-defined function referenced by a calling cell. "Creating" refers to the embodiment in which a function is re-instantiated for each calling cell during a recalculation operation. "Accessing" refers to the embodiment in which an instance of the function is stored for each cell in the worksheet that calls the functions. An input operation 712 inputs arguments to the called instance of the function. An execution instance executes the body of the user-defined function. A return operation 716 returns a result to the calling cell.

Figure 8:
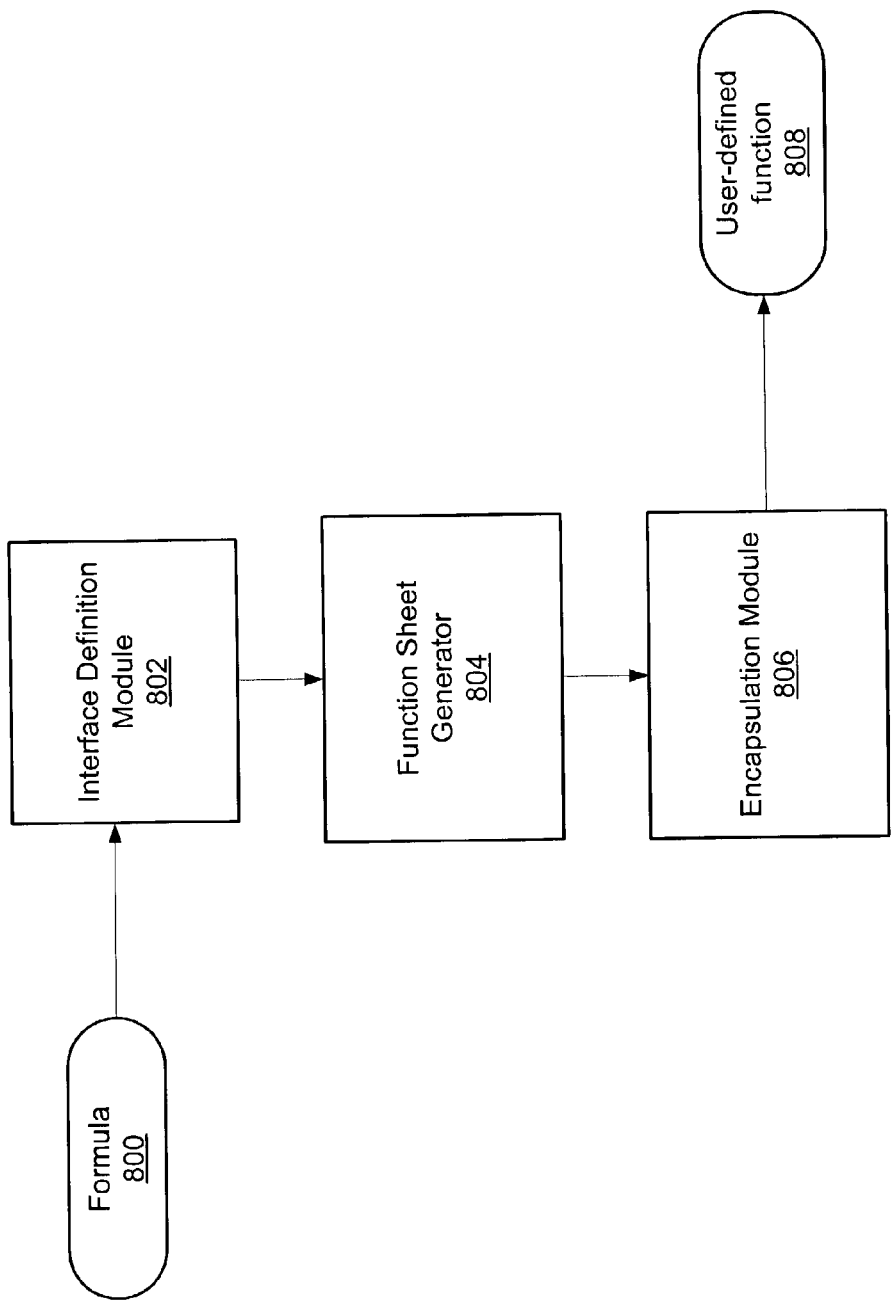
FIG. 8 illustrates a system for creating a user-defined function from a formula in an embodiment of the present invention.

FIG. 8 illustrates a system for creating a user-defined function from a formula in an embodiment of the present invention. A formula 800 is entered into a worksheet. An interface definition module 802 defines the interface of the user-defined function, based the contents of the formula, user input, and/or a predetermined set of rules. A function sheet generator 804 is invoked to transfer the formula into a body of the function sheet. An encapsulation module 806 stores the user-defined function 808 so that the function may be accessed by a spreadsheet operation. In one embodiment, the user-defined function is stored according to its label and may be call from a calling cell using the label. During the encapsulation operation 806, the user may be queried for a name under which the function should be stored, although the label may be used by the spreadsheet application to offer a default name. In addition, if the interface definition module 802 was invoked from a cell of a worksheet containing a formula, the encapsulation module 806 may replace the formula in the cell of the worksheet with a call to the user-defined function (turning the cell of the worksheet into a "calling cell").

Because the formula has been encapsulated into a user-defined function, it may now be transferred (e.g., exported)

to other spreadsheet applications and to other computer systems. For example, a principal might develop and export the MyGrade function and provide copies of the function to teachers in the school. Likewise, each teacher may import the function into his or her own system. Furthermore, the teachers may customize the function to match their own needs (e.g., the number of grades in their courses). To customize the function, a teacher may edit an instance of the function that has been imported into the teacher's spreadsheet. Alternatively, the stored function may be opened in a function sheet (without regard to a calling cell) and edited by the user. Furthermore, the user-defined function may be compiled and/or optimized to improve performance of the function.

Figure 9:
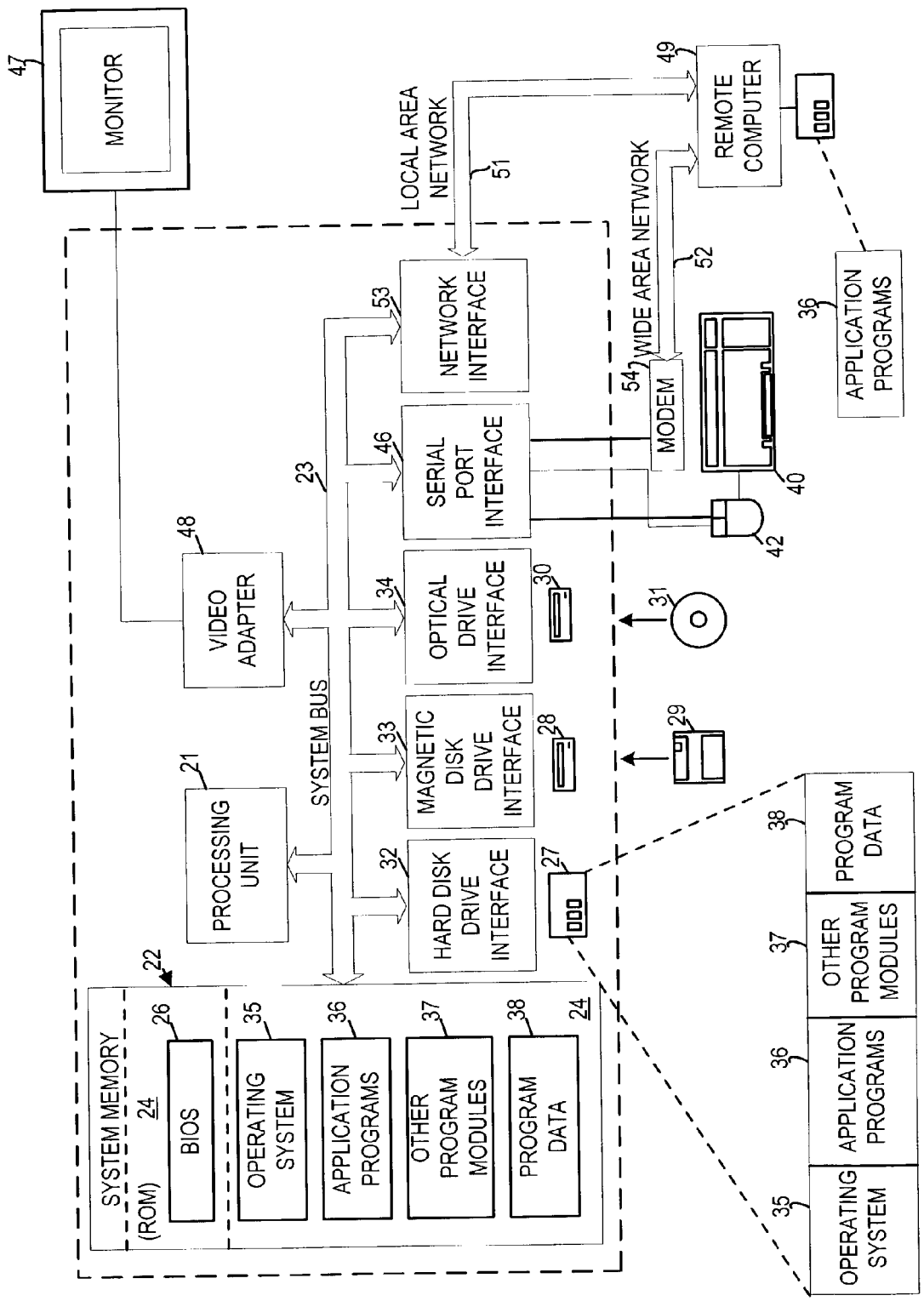
FIG. 9 illustrates an exemplary system useful for implementing an embodiment of the present invention.

The exemplary hardware and operating environment of FIG. 9 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 9. The logical connections depicted in FIG. 9 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a function sheet generator, an interface definition module, an encapsulation module may be incorporated as part of the operating system 35, application programs 36, or other program modules 37. Function sheets, worksheets, and user-defined functions may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. One or more computer-readable storage media containing executable instructions that, when executed, perform a method comprising:
receiving a formula in a spreadsheet application;
generating a distinct function sheet of the spreadsheet application associated with the formula;
transferring the formula to the function sheet to define at least a portion of an encapsulated user-defined function, wherein the function sheet is configured to accept formula-type operations that define the encapsulated user-defined function, wherein the encapsulated user-defined function includes one or more input parameters and a result parameter;
storing the encapsulated user-defined function;
associating the encapsulated user-defined function with a calling label; and
wherein the encapsulated user-defined function is callable using the calling label from within the spreadsheet application.

2. The one or more computer-readable storage media of claim 1 wherein the function sheet provides an edit capability.

3. The one or more computer-readable storage media of claim 1 wherein an input parameter of the one or more input parameters comprises a value representing a matrix, wherein the matrix is referenced in a single cell.

4. The one or more computer-readable storage media of claim 1 wherein the one or more input parameters further comprises one or more scalar values.

5. The one or more computer-readable storage media of claim 1 wherein the one or more input parameters further comprises one or more cells in the spreadsheet.

6. The one or more computer-readable storage media of claim 1 wherein the encapsulated user-defined function is callable from another spreadsheet application.

7. The one or more computer-readable storage media of claim 1 wherein the function sheet comprises a wizard that allows manipulation by the user.

8. A method comprising:
receiving a formula in a spreadsheet application; generating a distinct function sheet of the spreadsheet application associated with the formula;
transferring the formula to the function sheet to define at least a portion of an encapsulated user-defined function, wherein the function sheet is configured to accept formula-type operations that define the encapsulated user-defined function, wherein the encapsulated user-defined function includes one or more input parameters and a result parameter;
storing the encapsulated user-defined function;
associating the encapsulated user-defined function with a calling label;
wherein the encapsulated user-defined function is callable using the calling label from within the spreadsheet application.

9. The method of claim 8 wherein the function sheet provides an edit capability.

10. The method of claim 8 wherein input parameters comprises a value representing a matrix, wherein the matrix is referenced in a single cell.

11. The method of claim 8 wherein the one or more input parameters further comprises one or more scalar values.

12. The method of claim 8 wherein the one or more input parameters further comprises one or more cells in the spreadsheet.

13. The method of claim 8 wherein the encapsulated user defined function is callable from another.

14. The method of claim 8 wherein the function sheet comprises a wizard that allows manipulation by the user.

15. A system comprising:
a display device; and
means for displaying a spreadsheet application on the display device;
means for receiving a formula in the spreadsheet application;
means for generating a distinct function sheet of the spreadsheet application associated with the formula and transferring the formula to the function sheet to define at least a portion of an encapsulated user-defined function, wherein the function sheet is configured to accept formula-type operations that define the encapsulated user-defined function, wherein the encapsulated user-defined function includes one or more input parameters and a result parameter;
means for storing the encapsulated user-defined function;
means for associating the encapsulated user-defined function with a calling label; and
wherein the encapsulated user-defined function is callable using the calling label from the spreadsheet application.

* * * * *